R. S. FRANZ.
BRAKE ATTACHMENT FOR MOTOR VEHICLES.
APPLICATION FILED DEC. 8, 1915.
1,219,718.
Patented Mar. 20, 1917.
2 SHEETS—SHEET 1.
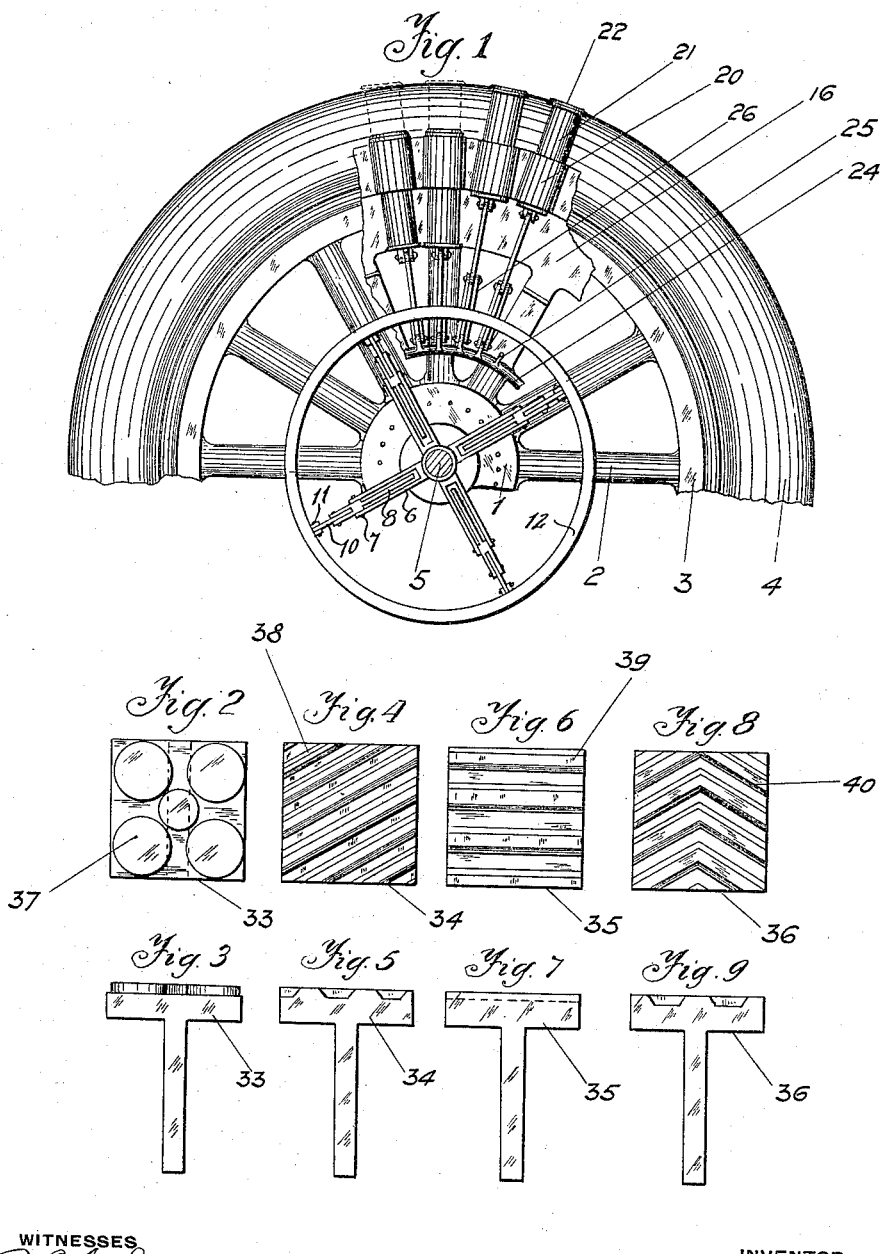

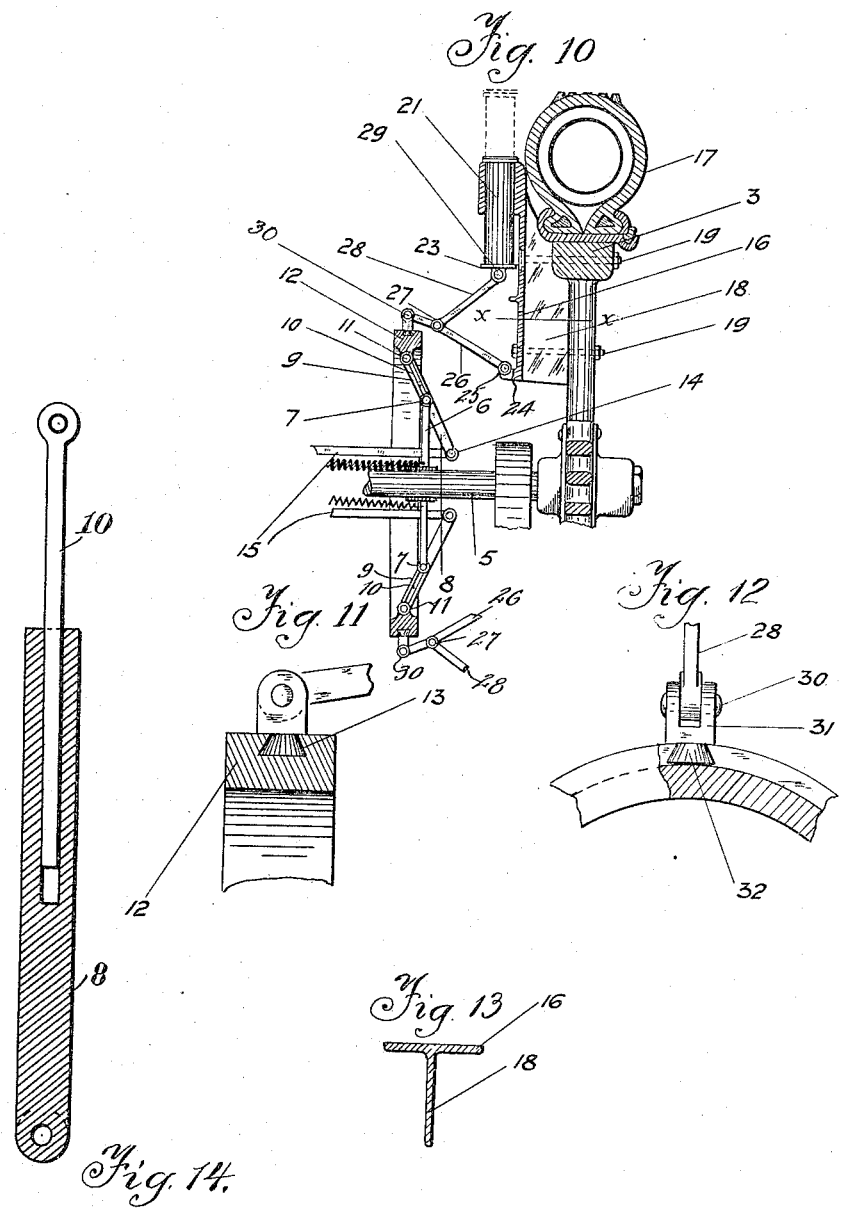

UNITED STATES PATENT OFFICE.

ROBERT S. FRANZ, OF ETNA, PENNSYLVANIA.

BRAKE ATTACHMENT FOR MOTOR-VEHICLES.

1,219,718.  Specification of Letters Patent.  Patented Mar. 20, 1917.

Application filed December 8, 1915. Serial No. 65,698.

*To all whom it may concern:*

Be it known that I, ROBERT S. FRANZ, a citizen of the United States, residing at Etna, in the county of Allegheny and State of Pennsylvania, have invented certain new and useful Improvements in Brake Attachments for Motor-Vehicles, of which the following is a specification.

This invention relates to a brake attachment for motor vehicles and has for its object to provide an attachment of such class, in a manner as hereinafter set forth, with means capable of being arranged with respect to the wheel and operated from the body of the vehicle to set up a braking action to retard the travel of the vehicle and to further prevent skidding or sluing of the vehicle wheel.

Further objects of the invention are to provide a brake attachment for motor vehicles which is comparatively simple in its construction and arrangement, strong, durable, efficient in its use, conveniently operated, readily assembled with respect to the vehicle wheel, and comparatively inexpensive.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation, broken away, of a vehicle wheel showing the adaptation therewith of a brake attachment in accordance with this invention, the attachment being broken away and a plurality of the plungers being shown to illustrate the position thereof when shifted to perform a braking function.

Figs. 2 to 9 are front and side views of several forms of brake shoes.

Fig. 10 is a vertical sectional view of a vehicle wheel, the latter being broken away, showing the adaptation therewith of a brake attachment in accordance with this invention.

Figs. 11 and 12 are sectional details of the pivotal-carrier for the brake elements shifting levers.

Fig. 13 is a sectional detail of the supporting plate.

Fig. 14, is a sectional detail illustrating the connection between the slip rod and the lever.

Referring to the drawings in detail 1 denotes a hub, 2 the spokes, 3 the rim and 4 the tire of a motor vehicle wheel. 5 denotes the axle and fixedly mounted thereon is a series of radially disposed posts or standards 6, each of which has pivotally connected therewith, as at 7, an operating lever 8, bifurcated as at 9 and in which is slidably arranged a slip rod 10 pivotally connected as at 11, to annular member 12, the latter being termed a shiftable carrier, and which has formed in its periphery a dove-tailed slot 13.

Pivotally connected as at 14, to a pair of levers 8, are spring controlled operating rods 15, one arranged above and the other below the vehicle axle. The operating rods are adapted to be coupled with an actuating means therefor, not shown, which extends into the body of the vehicle so it can be conveniently actuated when occasion so requires.

The reference character 16 denotes a supporting plate which extends against the side of the outer shoe 17 of the tire. The plate 16 is formed with a series of space webs 18 which abut against the rim 3 and spokes 2 and provide means for supporting the plate 16 from the spokes and rim. Hold fast devices 19 are employed for fixedly securing the plate 16 in position. These devices extend through the rim and spokes, as well as through the webs 18.

The plate 16 is circular in contour and has the marginal portion of its outer face provided with a series of radially disposed cylinders 20 arranged in spaced relation and which are an integral portion of the plate 16. Mounted in each of the cylinders 20 is a plunger 21 provided with a brake shoe 22. The plunger 21 and brake shoes 22 constitute the brake elements of the device. The length of the plungers is such that when they are shifted the brake shoes will project slightly beyond the tread of the wheel and engage the surface over which the wheel is traveling thereby setting up a braking action and preventing the sluing or skidding of the wheel.

The inner ends of the plungers 21 are enlarged as at 23 to prevent the shifting of the plungers entirely through the cylinders 20 when the braking operation is set up and the brake shoes 22 are of greater size than the plungers 21 so as to arrest inward movement of the plungers when the brake elements assume their normal position.

The marginal portion of the plates 16 has the inner side thereof formed with an annular rib 24 provided with spaced apertured lugs 25 and pivotally connected to each of said lugs 25 are the inner ends of a pair of links 26. The outer ends of each pair of links 26 are pivotally connected, as at 27, to a bell-crank lever 28.

Each of the plungers 21 has its rear end formed with an apertured lug 29 with which is pivotally connected one end of a lever 28 and the other end of each lever 28 is pivotally connected as at 30, in a bracket 31, having a tapered extension 32, which is slidably mounted in the slot 13 of the shiftable carrier. The extension 32 is capable of turning in the groove 13.

Referring to Figs. 2 to 9, the reference characters 33, 34, 35, and 36 denote different forms of brake shoes and each of which consists of a head provided with a shank. The shanks are anchored in the plungers 21. The brake shoe 33 has its gripping face formed with lugs 37; the brake shoe 34 with diagonally disposed ribs 38; the brake shoe 35 with transverse ribs 39 and the brake shoe 36 with V-shaped ribs 40.

The elements 6 to 15 are stationary while the other elements are revolved by the wheel.

The shiftable carrier is capable of being shifted concentrically and outwardly with respect to the axle 5, and when moved to such position, the links 26 and levers 28 are shifted to move their associated plungers 21 outward, to cause certain of the brake shoes to grip the surface over which the wheel is traveling. As the rods 15 are spring controlled, when they are released, the shiftable carrier will move to normal position and under such conditions the braking elements are withdrawn.

What I claim is:—

1. A brake attachment for motor vehicles comprising an annular member provided with a circumferential groove, adapted to be supported from and surround the axle of a vehicle, a plurality of reciprocatory braking elements, brake element supporting means adapted to be carried by the vehicle wheel, brackets swivelly mounted in said groove, lever mechanisms pivotally connected with said brackets and with said elements for shifting these latter, links pivotally connected with said mechanisms and with said supporting means, and operating means pivotally connected with said member for moving it concentrically with respect to the vehicle axle causing thereby the actuation of the lever mechanisms and shifting of said elements.

2. A brake attachment for motor vehicles comprising an annular member provided with a circumferential groove adapted to be supported from and surround the axle of a vehicle, a plurality of reciprocatory braking elements, brake element supporting means adapted to be carried by the vehicle wheel, brackets swivelly mounted in said groove, lever mechanisms pivotally connected with said brackets and with said elements for shifting these latter, links pivotally connected with said mechanisms and with said supporting means, and operating means pivotally connected with said member for moving it concentrically with respect to the vehicle axle causing thereby the actuation of the lever mechanisms and shifting of said elements, and means for limiting the movement of said elements.

3. A brake attachment for motor vehicles comprising an annular member provided with a circumferential groove adapted to be supported from and surround the axle of a vehicle, a plurality of reciprocatory braking elements, brake element supporting means adapted to be carried by the vehicle wheel, brackets swivelly mounted in said groove, lever mechanisms pivotally connected with said brackets and with said elements for shifting these latter, links pivotally connected with said mechanisms and with said supporting means, and a spring controlled operating means pivotally connected with said member for moving it concentrically with respect to the vehicle axle causing thereby the actuation of the lever mechanisms and shifting of said elements.

4. A brake attachment for motor vehicles comprising an annular member provided with a circumferential groove, adapted to be supported from and surround the axle of a vehicle, a plurality of reciprocatory braking elements, brake element supporting means adapted to be carried by the vehicle wheel, brackets swivelly mounted in said groove, lever mechanisms pivotally connected with said brackets and with said elements for shifting these latter, links pivotally connected with said mechanisms and with said supporting means, and a spring controlled operating means pivotally connected with said member for moving it concentrically with respect to the vehicle axle causing thereby the actuation of the lever mechanisms and shifting of said elements, and means for limiting the movement in either direction of said braking elements.

5. A braking attachment for vehicle wheels comprising a support adapted to be secured to one side of the vehicle wheel near the tire thereof, braking elements carried by said support, lever mechanisms for actuating said elements, links pivotally connected with said support and said mechanisms, a shiftable annular member, brackets swivelly mounted in the periphery of said member, means for pivoting said mechanisms to said brackets, and a spring controlled operating means for and pivotally connected with said member for operating the latter to actuate the lever mechanisms to shift said elements.

6. A braking attachment for vehicle wheels comprising a support adapted to be secured to one side of the vehicle wheel near the tire thereof, braking elements carried by said support, lever mechanisms for actuating said elements, links pivotally connected with said support and said mechanisms, a shiftable annular member, brackets swivelly mounted in the periphery of said member, means for pivoting said mechanisms to said brackets, and a spring controlled operating means for and pivotally connected with said member for operating the latter to actuate the lever mechanisms to shift said elements, and means for limiting the movement in either direction of said elements.

In testimony whereof I affix my signature in the presence of a witness.

ROBERT S. FRANZ.

Witness:
LUELLA H. SIMON.

Copies of this patent may be obtained for five cents each, by addressing the "Commissioner of Patents Washington, D. C."